(12) United States Patent
Chang et al.

(10) Patent No.: US 10,982,091 B2
(45) Date of Patent: Apr. 20, 2021

(54) THERMOPLASTIC RESIN COMPOSITION HAVING EXCELLENT THERMAL STABILITY AND LOW BIREFRINGENCE AND MOLDED ATRICLE THEREOF

(71) Applicants: HYUNDAI MOBIS CO., LTD., Seoul (KR); SAMYANG CORPORATION, Seoul (KR)

(72) Inventors: Jae Joon Chang, Suwon-si (KR); Joung Hoon Lee, Yongin-si (KR); Hyun Jee Lee, Yongin-si (KR); Keun Hyung Lee, Yongin-si (KR); Jung Kyu Han, Daejeon (KR); Tae Jin An, Daejeon (KR); Nung Hyun Kim, Daejeon (KR); Hyung Jin Roh, Daejeon (KR)

(73) Assignees: HYUNDAI MOBIS CO., LTD., Seoul (KR); SAMYANG CORPORATION, Seoul (KR)

( * ) Notice: Subject to any disclaimer, the term of this patent is extended or adjusted under 35 U.S.C. 154(b) by 88 days.

(21) Appl. No.: 16/107,530

(22) Filed: Aug. 21, 2018

(65) Prior Publication Data

US 2019/0055401 A1    Feb. 21, 2019

(30) Foreign Application Priority Data

Aug. 21, 2017   (KR) .................. 10-2017-0105748

(51) Int. Cl.
*C08L 69/00*  (2006.01)
(52) U.S. Cl.
CPC ........... *C08L 69/00* (2013.01); *C08L 2201/08* (2013.01)

(58) Field of Classification Search
CPC ...... C08L 69/00; C08L 63/00; C08L 2201/08; C08K 2003/321; C08K 3/32; C08K 5/521
See application file for complete search history.

(56) References Cited

U.S. PATENT DOCUMENTS

2016/0362548 A1* 12/2016 Tanghua ................. C08L 69/00

FOREIGN PATENT DOCUMENTS

| CN | 104987691 A | | 10/2015 | |
| EP | 2818499 A1 | * | 12/2014 | ............ C08J 9/0061 |
| JP | 2014-189713 | * | 10/2014 | ............ C08G 59/04 |
| JP | 2017-014368 | * | 1/2017 | ............ C08L 69/00 |
| KR | 10-0224044 B1 | | 10/1999 | |
| KR | 10-2015-0003686 A | | 1/2015 | |

OTHER PUBLICATIONS

English machine translation of JP 2017-014368. (Year: 2017).*
English machine translation of JP 2014-189713. (Year: 2014).*
Office Action of corresponding Chinese Patent Application No. 201810933441.5—7 pages (dated Jun. 29, 2020).

* cited by examiner

*Primary Examiner* — John E Uselding
(74) *Attorney, Agent, or Firm* — Knobbe Martens Olson & Bear LLP

(57) ABSTRACT

The present invention relates to a thermoplastic resin composition having excellent thermal stability and birefringence properties and to a molded article formed therefrom. In one embodiment, the thermoplastic resin composition includes: 100 parts by weight of a polycarbonate resin including a repeating unit represented by formula 1; about 0.2 parts by weight to about 15 parts by weight of an epoxy resin represented by formula 2; and about 1 part by weight to about 15 parts by weight of a phosphate-based compound, wherein formula 1 and formula 2 are as defined in the detailed description.

9 Claims, 1 Drawing Sheet

| Classification | LCD | Example 1 + air + LCD | Example 1+OCR+LCD |
|---|---|---|---|
| (center±5° mean value) [unit: cd/m²] | 960 [987: highest value] | 876 [891: highest value] [91.3%/90.3%] | 948 [960: highest value] [98.7%/97.2%] |
| Remarks | ←LCD | ←example 1 ←Tape ←LCD | ←example 1 ←OCR ←LCD |

| Classification | LCD | Example 1 + air + LCD | Example 1+OCR+LCD |
|---|---|---|---|
| (center±5° mean value) [unit: cd/m²] | 960 [987: highest value] | 876 [891: highest value] [91.3%/90.3%] | 948 [960: highest value] [98.7%/97.2%] |
| Remarks | ▬ ← LCD | ← example 1<br>← Tape<br>← LCD | ← example 1<br>← OCR<br>← LCD |

THERMOPLASTIC RESIN COMPOSITION HAVING EXCELLENT THERMAL STABILITY AND LOW BIREFRINGENCE AND MOLDED ATRICLE THEREOF

CROSS-REFERENCE TO RELATED APPLICATION

This application claims the benefit of Korean Patent Application No. 10-2017-0105748, filed on Aug. 21, 2017 in the Korean Intellectual Property Office, the entire disclosure of which is incorporated herein by reference.

BACKGROUND OF THE INVENTION

Field of the Invention

The present invention relates to a thermoplastic resin composition having excellent thermal stability and low birefringence properties and to a molded article formed therefrom.

Description of the Related Art

Polycarbonate resin produced from 2,2-bis(4-hydroxyphenyl)propane (or bisphenol A) has very excellent transparency, heat resistance, low absorbency, chemical resistance, mechanical strength and dimensional stability properties, and thus is widely used for substrates for CD or DVD, various molded articles for electrical/electronic applications, such as molded articles for optical applications, automotive parts, and the like. However, the polycarbonate resin produced from bisphenol A has high birefringence, and thus has a problem in that it is difficult to use in fields that require low birefringence.

Meanwhile, in fields that require low birefringence, acrylic resin and the like are used. However, the acrylic resin has disadvantages of high absorbency rate, low dimensional stability, low impact resistance, and low chemical resistance.

In recent years, as environmental pollution has intensified and regulations against the use of materials causing environmental pollution have been strengthened, interest in environmentally friendly materials has increased. Accordingly, studies on environmentally friendly materials have been actively conducted to satisfy the consumer demand for environmentally friendly materials. The above-described bisphenol A-based polycarbonate and acrylic resins are produced using raw materials obtained from petroleum resources, but have raised problems such as depletion of petroleum resources and global environmental pollution. In order to replace these resins, studies have been actively conducted on the use of environmentally friendly resins produced using raw materials derived from organisms such as plants.

In order to meet the above-described industrial demand and to overcome the above-described problems, studies have been conducted on thermoplastic resin compositions, particularly polycarbonate resin compositions which are highly environmentally friendly and have excellent transparency and low birefringence. For example, Korean Patent Application Publication No. 2015-0003686 discloses an environmentally friendly polycarbonate resin produced using isosorbide which is a compound derived from corn starch. The composition disclosed therein has an advantage in that it is environmentally friendly due to the use of a plant-derived raw material. However, the polycarbonate material produced using isosorbide has reduced extrusion compatibility with a polycarbonate material produced by an interfacial or melt polymerization process, and thus the range of application thereof is very limited. In addition, the retention stability of the polycarbonate resin in the cylinder during injection molding may be reduced so that an injection-molded article produced using the same may have reduced physical properties, may be discolored, may have increased birefringence due to the occurrence of haze, and may have a poor appearance due to the occurrence of silver streaks.

Accordingly, there is a need to develop an environmentally friendly polycarbonate resin composition which has high flowability and excellent processability so that non-mounding and surface defect phenomena can be prevented, and which has excellent heat retention stability so that the resin can be prevented from being deteriorated due to heat retention resulting from the increase in molding processing time caused by various designs, including large surface areas, thick thicknesses and complex shapes, and so that the inherent color of the resin can be retained.

SUMMARY OF THE INVENTION

One aspect of the present invention is directed to a thermoplastic resin composition. In one embodiment, the thermoplastic resin composition includes: 100 parts by weight of a polycarbonate resin including a repeating unit represented by the following formula 1; about 0.2 parts by weight to about 15 parts by weight of an epoxy resin represented by the following formula 2; and about 1 part by weight to about 15 parts by weight of a phosphate-based compound:

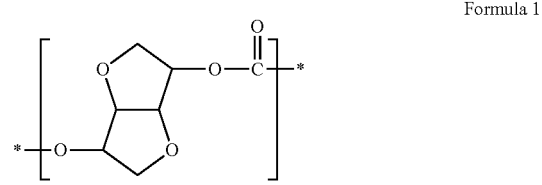

Formula 1 wherein * is a linkage;

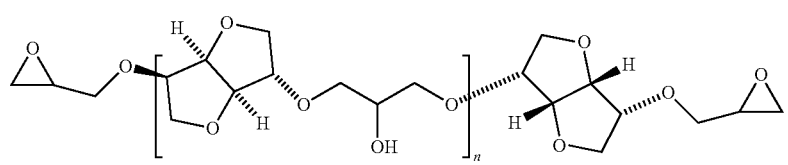

Formula 2 wherein n is an integer ranging from 0 to 300.

In one embodiment, the polycarbonate resin may be produced by copolymerization of a diol compound, which includes a plant-derived isosorbide represented by the following formula 1a, with a carbonic diester compound:

Formula 1a

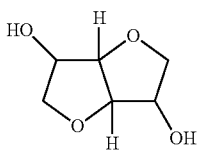

In one embodiment, the polycarbonate resin may include about 30 mol % to about 95 mol % of the repeating unit of formula 1.

In one embodiment, the polycarbonate resin may have a viscosity-average molecular weight of about 15000 g/mol to about 25000 g/mol.

In one embodiment, the epoxy resin represented by formula 2 may be produced by a process including: reacting plant-derived isosorbide with glycerin to obtain an epichlorohydrin; and allowing the epichlorohydrin to react in the presence of an aqueous hydroxide solution.

In one embodiment, the epoxy resin may have an epoxy equivalent weight of about 100 g/eq to about 300 g/eq and a viscosity of about 1,000 cps to about 10,000 cps as measured at 25° C.

In one embodiment, the phosphate-based compound may be represented by the following formula 5:

Formula 5

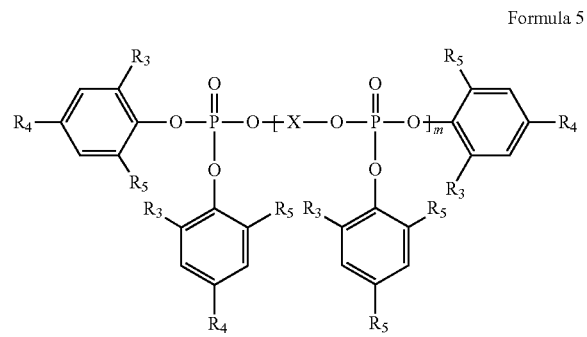

wherein $R_3$, $R_4$ and $R_5$ are each independently hydrogen or a $C_1$-$C_4$ alkyl group; X is a $C_6$-$C_{20}$ aryl group or a $C_6$-$C_{20}$ aryl group substituted with a $C_1$-$C_4$ alkyl group; and m is an integer ranging from 0 to 4.

In one embodiment, the phosphate-based compound may include one or more of triphenyl phosphate, tricresyl phosphate, trixylenyl phosphate, tri(2,6-dimethylphenyl)phosphate, tri(2,4,6-trimethylphenyl)phosphate, tri(2,4-di-tertairy-butylphenyl)phosphate, tri(2,6-di-tertairy-butylphenyl)phosphate, resorcinol bis(diphenyl)phosphate, resorcinol bis(2,6-dimethylphenyl)phosphate, resorcinol bis(2,4-di-tertairy-butylphenyl)phosphate, hydroquinol bis(2,6-dimethylphenyl)phosphate, and hydroquinol bis(2,4-di-tertairy-butylphenyl)phosphate.

In one embodiment, the thermoplastic resin composition may further include, based on 100 parts by weight of the polycarbonate resin, about 0.5 parts by weight to about 15 parts by weight of an antioxidant. The antioxidant may include one or more of phosphite-based antioxidants, sulfur-based antioxidants and phenol-based antioxidants.

In one embodiment, the antioxidant and the phosphate-based compound may be included at a weight ratio of about 1:2 to about 1:13.

In one embodiment, the thermoplastic resin composition may have a flow index of about 40 g/10 min or more as measured at 260° C. under a load of 2.16 kg in accordance with ASTM D1238, a haze of about 2.0% or less as measured for a 3.2 mm thick sample in accordance with ASTM D1003, and a transmittance of about 88% or more as measured for a 3.2 mm thick sample in accordance with ASTM D1003.

In one embodiment, the thermoplastic resin composition may have a yellowness index difference ($\Delta YI$) of about 0.3 or less as calculated according to the following equation 1:

$$\Delta YI = YI_1 - YI_0 \qquad \text{Equation 1}$$

wherein $YI_0$ is a yellowness index measured using a spectrophotometer (Minolta, CM-3700D) for a thermoplastic resin composition sample obtained by injection molding at an injection molding temperature (cylinder temperature) of 250° C. with a cycle time of 20 seconds, and $YI_1$ is a yellowness index measured for a thermoplastic resin composition sample obtained by injection molding at an injection molding temperature (cylinder temperature) of 250° C. after the thermoplastic resin composition in a molten state was left in the cylinder for 15 minutes.

Another aspect of the present invention is directed to a molded article formed from the thermoplastic resin composition.

The thermoplastic resin composition of the present invention is highly environmentally friendly and has high transparency and low birefringence. Furthermore, the thermoplastic resin composition has excellent thermal stability and high flowability, and thus when it is processed into a complex-shaped structure having a large surface area and a thick thickness, the thermoplastic resin composition can be prevented from being deteriorated due to long-term heat retention, even under long-term molding processing conditions, so that the discoloration and decrease in transparency of the molded article can be prevented. In addition, the thermoplastic resin composition of the present invention may be effectively applied for the production of not only products which require excellent surface properties and optical properties such as transparency, but also of parts which require a long molding processing time due to mold structures. For example, the thermoplastic resin composition may be effectively applied to optical films, optical sheets, mobile phone housings, TV housings, computer monitor housings, automotive panel housings, automotive interior lighting housings, and the like.

BRIEF DESCRIPTION OF THE DRAWINGS

The Figure shows the results of evaluating the optical performance of an example according to the present invention.

DETAILED DESCRIPTION OF THE INVENTION

In the following description, the detailed description of related known technology will be omitted when it may obscure the subject matter of the present invention.

In addition, the terms of constituent elements, which will be described hereinafter, are defined in consideration of their functions in the present invention and may be changed according to the intention of a user or an operator, or according to the custom. Accordingly, definitions of these terms must be based on the overall description herein.

Thermoplastic Resin Composition

One aspect of the present invention is directed to a thermoplastic resin composition. In one embodiment, the thermoplastic resin composition includes: 100 parts by weight of a polycarbonate resin including a repeating unit represented by the following formula 1; about 0.2 parts by weight to about 15 parts by weight of an epoxy resin represented by the following formula 2; and about 1 part by weight to about 15 parts by weight of a phosphate-based compound:

Formula 1

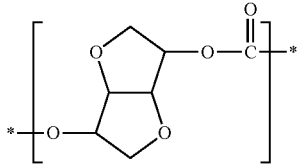

wherein * is a linkage;

Formula 1

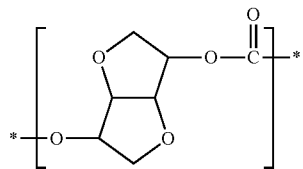

wherein * is a linkage.

In one embodiment, the repeating unit of formula 1 may be included in an amount of about 30 mol % to about 95 mol % based on 100 mol % of the polycarbonate resin. Under this condition, the thermoplastic resin composition may be highly environmentally friendly and may have excellent transparency, low birefringence, and excellent thermal stability and dimensional stability. For example, the repeating Formula 2

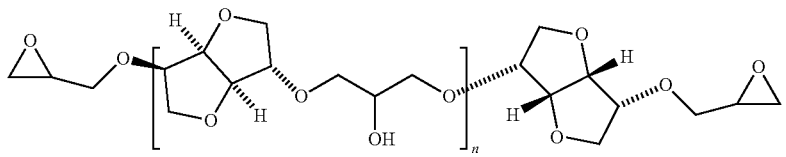

wherein n is an integer ranging from 0 to 300.

Polycarbonate Resin

The polycarbonate resin may be produced by melt polymerization of a plant-derived diol compound which replaces at least a portion of a diol compound which is used in the production of polycarbonate.

In one embodiment, the plant-derived diol compound may include an alicyclic dihydroxy compound. For example, the plant-derived diol compound may be an isosorbide represented by the following formula 1a:

Formula 1a

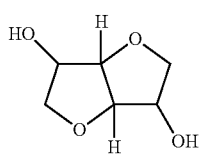

The isosorbide is a diol type anhydrous sugar alcohol obtained by dehydrating sorbitol which is a sugar alcohol having 6 carbon atoms. In the present invention, a plant-derived isosorbide may be used. For example, an isosorbide produced by dehydration of starch-derived sorbitol may be used.

In one embodiment, the polycarbonate resin includes a repeating unit, derived from the isosorbide and represented by the following formula 1:

unit of formula 1 may be included in an amount of about 30 mol % to about 85 mol % based on 100 mol % of the polycarbonate resin.

In one embodiment, the polycarbonate resin may be produced by copolymerization of a diol compound with a carbonic diester compound.

In one embodiment, the polycarbonate resin may be produced by copolymerization of a diol compound, which includes the plant-derived isosorbide represented by formula 1a, with a carbonic diester compound.

In one embodiment, the isosorbide may be included in an amount of about 30 mol % to about 98 mol % based on 100 mol % of the diol compound. For example, it may be included in an amount of about 50 mol % to about 95 mol %. As another example, it may be included in an amount of about 85 mol % to about 95 mol %. Under this condition, the thermoplastic resin composition may be highly environmentally friendly and may have excellent transparency, low birefringence, and excellent thermal stability and dimensional stability.

The viscosity-average molecular weight of the polycarbonate resin may be similar to that of a bisphenol A-based polycarbonate having a viscosity-average molecular weight of about 15,000 g/mol to about 25,000 g/mol. In one embodiment, the viscosity-average molecular weight of the polycarbonate resin may be about 17,000 g/mol to about 20,000 g/mol. Under this condition, the thermoplastic resin composition of the present invention may have excellent flowability, moldability and mechanical properties.

The polycarbonate resin may further include a repeating unit derived from the diol compound. For example, the diol compound may further include, in addition to the isosorbide represented by formula 1a, a repeating unit derived from an aromatic diol.

In one embodiment, when the aromatic diol is naphthalene diol, it may include a repeating unit represented by the following formula 3a, and when the aromatic diol is biphenol, it may include a repeating unit represented by the following formula 3b, and when the aromatic diol is a mixture of naphthalene diol and biphenol, it may include both a repeating unit of the following formula 3a and a repeating unit of the following formula 3b:

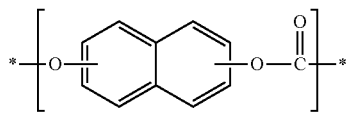

Formula 3a wherein * is a linkage;

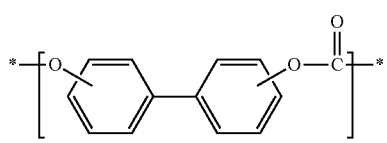

Formula 3b wherein * is a linkage.

The carbonic diester compound that is used in the present invention may be a diorgano-carbonate having two organic groups selected from among an alkyl group, an aryl group and an aralkyl group. For example, it may be a compound represented by the following formula 4:

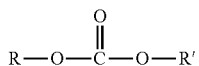

Formula 4 wherein R and R' are each independently a unsubstituted or halogen-substituted $C_1$-$C_{18}$ alkyl group, $C_6$-$C_{20}$ aryl group or $C_7$-$C_{25}$ aralkyl group.

In one embodiment, the carbonic diester compound that is used in the present invention may be selected from diphenyl carbonate, bis-chlorophenyl-carbonate, dimethyl carbonate, diethyl carbonate, and mixtures thereof. For example, it may be diphenyl carbonate.

Epoxy Resin

The epoxy resin may be represented by the following formula 2:

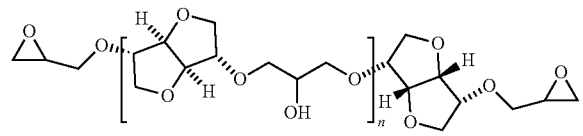

Formula 2 wherein n is an integer ranging from 0 to 300.

The epoxy resin of formula 2 has a molecular structure including two epoxy groups bonded to the isosorbide backbone. The isosorbide may have the structure of formula 1a.

For example, the epoxy resin of formula 2 may include isosorbide diglycidyl ether.

The epoxy resin may be produced by a conventional process. For example, the epoxy resin may be produced by a process including: reacting the isosorbide of formula 1 with glycerin to obtain an epichlorohydrin; and subjecting the epichlorohydrin to a first reaction in the presence of an aqueous hydroxide solution, thereby producing a first reaction product. For example, the first reaction product may be placed under reduced pressure, and then subjected to a second reaction, thereby producing a second reaction product, and the upper layer portion of the second reaction product may be collected and filtered.

The epoxy resin may have an epoxy equivalent weight of about 100 g/eq to about 300 g/eq and a viscosity of about 1,000 cps to about 10,000 cps as measured at 25° C. Under these equivalent weight and viscosity conditions, the thermoplastic resin composition of the present invention may have excellent flowability, miscibility and moldability, and a molded article formed therefrom may have an excellent balance of physical properties. For example, the epoxy resin may have an epoxy equivalent weight of about 150 g/eq to about 250 g/eq and a viscosity of about 1,000 cps to about 2,000 cps.

In one embodiment, the epoxy resin may be included in an amount of about 0.2 parts by weight to about 15 parts by weight based on 100 parts by weight of the polycarbonate resin. If the epoxy resin is included in an amount of less than about 0.2 parts by weight, the mechanical properties of the thermoplastic resin composition will be reduced, and if the epoxy resin is included in an amount of more than about 15 parts by weight, the thermal stability of the thermoplastic resin composition of the present invention will be reduced, so that the mechanical properties and appearance of a molded article formed therefrom can be deteriorated during long-term heat retention for processing. For example, the epoxy resin may be included in an amount of about 0.2, 0.3, 0.4, 0.5, 0.6, 0.7, 0.8, 0.9, 1, 2, 3, 4, 5, 6, 7, 8, 9, 10, 11, 12, 13, 14 or 15 parts by weight.

Phosphate-Based Compound

The phosphate-based compound serves to improve the flowability of the thermoplastic resin composition of the present invention. In one embodiment, the phosphate-based compound may have a structure represented by the following formula 5:

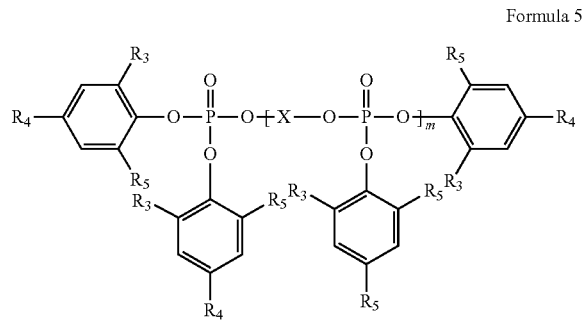

Formula 5 wherein $R_3$, $R_4$ and $R_5$ are each independently hydrogen or a $C_1$-$C_4$ alkyl group; X is a $C_6$-$C_{20}$ aryl group or a $C_6$-$C_{20}$ aryl group substituted with a $C_1$-$C_4$ alkyl group; and m is an integer ranging from 0 to 4.

X in formula 5 above may preferably be one derived from the di-alcohol of resorcinol, hydroquinol or bisphenol A. When m in formula 5 is 0, examples of the phosphate-based compound include triphenyl phosphate, tricresyl phosphate, trixylenyl phosphate, tri(2,6-dimethylphenyl)phosphate, tri (2,4,6-trimethylphenyl)phosphate, tri(2,4-di-tertairy-butylphenyl)phosphate, and tri(2,6-di-tertairy-butylphenyl) phosphate. When m in formula 5 is 1, examples of the phosphate-based compound include resorcinol bis(diphenyl)

phosphate, resorcinol bis(2,6-dimethylphenyl)phosphate, resorcinol bis(2,4-di-tertairy-butylphenyl)phosphate, hydroquinol bis(2,6-diniethylphenyl)phosphate, and hydroquinol bis(2,4-di-tertairy-butylphenyl)phosphate. These phosphate-based compounds may be used alone or as a mixture of two or more. For example, the phosphate-based compound may include resorcinol bis(2,6-dimethylphenyl)phosphate.

In one embodiment, the phosphate-based compound may be included in an amount of about 1 part by weight to about 15 parts by weight based on 100 parts by weight of the polycarbonate resin. If the phosphate-based compound is included in an amount of less than about 1 part by weight, the flowability of the thermoplastic resin composition of the present invention may be reduced, and if the phosphate-based compound is included in an amount of more than about 15 parts by weight, the transparency, appearance and thermal stability of the thermoplastic resin composition may be reduced. For example, the phosphate-based compound may be included in an amount of about 1, 2, 3, 4, 5, 6, 7, 8, 9, 10, 11, 12, 13, 14 or 15 parts by weight.

Antioxidant

In one embodiment, the thermoplastic resin composition may further include an antioxidant.

In one embodiment, the antioxidant may include one or more of phosphite-based antioxidants, sulfur-based antioxidants and phenol-based antioxidants, in view of oxidation stability, thermal stability and the like.

In one embodiment, the antioxidant may be included in an amount of about 0.5 parts by weight to about 15 parts by weight based on 100 parts by weight of the polycarbonate resin. When the antioxidant is included in an amount in this range, the thermoplastic resin composition of the present invention may have excellent oxidation stability and thermal stability. For example, the antioxidant may be included in an amount of about 0.5, 0.6, 0.7, 0.8, 0.9, 1, 2, 3, 4, 5, 6, 7, 8, 9, 10, 11, 12, 13, 14 or 15 parts by weight.

In one embodiment, the phosphite-based antioxidants may include triphenyl phosphite, tris(nonylphenyl)phosphite, tris(2,4-di-tert-butylphenyl)phosphite, tridecyl phosphite, trioctyl phosphite, trioctadecyl phosphite, didecylmonophenyl phisphate, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol phosphite, 2,2-methylenebis(4,6-di-tert-butylphenyl)octyl phosphite, bis(nonylphenyl) pentaerythritol diphosphite, bis(2,4-di-tert-butylphenyl) pentaerythritol diphosphite, bis(2,4-dicumylphenyl) pentaerythritol diphosphite, distearyl pentaerythritol diphosphite, and the like. For example, the phosphite-based antioxidants may include tris(nonylphenyl)phosphite, trimethyl phosphite, tris(2,4-di-tert-butylphenyl)phosphite, bis (2,4-di-tert-butylphenyl)pentaerythritol diphosphite, bis(2, 4-dicumylphenyl)pentaerythritol diphosphite, bis(2,6-di-tert-butyl-4-methylphenyl)pentaerythritol diphosphite, and the like. These may be used alone or as a mixture of two or more.

In one embodiment, the phosphite-based antioxidant may be included in an amount of about 0.05 parts by weight to about 5 parts by weight based on 100 parts by weight of the polycarbonate resin. For example, it may be included in an amount of about 0.2 to about 2.5 parts by weight. As another example, it may be included in an amount of about 0.3 parts by weight to about 1 parts by weight. When the phosphite-based antioxidant is included in the above-described amount, the thermoplastic resin composition of the present invention may have excellent heat-retention stability and appearance properties. For example, the phosphite-based antioxidant may be included in an amount of about 0.02, 0.05, 0.1, 0.2, 0.3, 0.4, 0.5, 0.6, 0.7, 0.8, 0.9, 1, 2, 3, 4 or 5 parts by weight.

In one embodiment, the sulfur-based antioxidants may include dilauryl-3,3'-thiodipropionic acid ester, ditridecyl-3, 3'-thiodipropionic acid ester, dimyristyl-3,3'-thiodipropionic acid ester, distearyl-3,3'-thiodipropionic acid ester, laurylstearyl-3,3'-thiodipropionic acid ester, pentaerythritoltetrakis(3-laurylthiopropionate), bis[2-methyl-4-(3-laurylthiopropionyloxy)-5-tert-butyl phenyl]sulfide, octadecyl disulfide, mercaptobenzoimidazole, 2-mercapto-6-methyl-benzimidazole, 1,1'-thiobis(2-naphthol), and the like. For example, pentaerythritoltetrakis(3-laurylthiopropionate) may be included.

In one embodiment, the sulfur-based antioxidant may be included in an amount of about 0.1 parts by weight to about 5 parts by weight based on 100 parts by weight of the polycarbonate resin. For example, it may be included in an amount of about 0.2 parts by weight to about 2.5 parts by weight. As another example, it may be included in an amount of about 0.3 parts by weight to about 1 part by weight. When the sulfur-based antioxidant is included in the above-described amount, the thermoplastic resin composition of the present invention may have excellent thermal stability and appearance properties. For example, the sulfur-based antioxidant may be included in an amount of about 0.1, 0.2, 0.3, 0.4, 0.5, 0.6, 0.7, 0.8, 0.9, 1, 2, 3, 4 or 5 parts by weight.

In one embodiment, the phenol-based antioxidants may include pentaerythritoltetrakis(3-mercaptopropionate), pentaerythritoltetrakis(3-laurylthiopropionate), glycerol-3-stearylthiopropionate, triethyleneglycol-bis[3-(3-tert-butyl-5-methyl-4-hydroxyphenyl)propionate], 1,6-hexanediol-bis [3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3, 5-di-tert-butyl-4-hydroxy-hydrocinnamide), 3,5-di-tert-butyl-4-hydroxy-benzylphosphonate-diethylester, tris(3,5-di-tert-butyl-4-hydroxybenzyl)isocyanurate, 4,4'-biphenylene diphosphinic acid tetrakis(2,4-di-tert-butylphenyl), 3,9-bis{1,1-dimethyl-2-[β-(3-tert-butyl-4-hydroxy-5-methylphenyl)propionyloxy]ethyl}-2,4,8,10-tetraoxaspiro(5,5)undecane, and the like.

For example, an aromatic monohydroxy compound substituted once or more with an alkyl group having 5 or more carbon atoms may be included. For example, one or more of octadecyl-3-(3,5-di-tert-butyl-4-hydroxyphenyl)propionate and pentaerythrityl-tetrakis[3-(3,5-di-tert-butyl-4-hydroxyphenyl)propionate] may be included.

In one embodiment, the phenol-based antioxidant may be included in an amount of about 0.1 parts by weight to about 5 parts by weight based on 100 parts by weight of the polycarbonate resin. For example, it may be included in an amount of about 0.2 parts by weight to about 2.5 parts by weight. As another example, it may be included in an amount of about 0.3 parts by weight to about 1 part by weight. When the phenol-based antioxidant is included in the above-described amount, the thermoplastic resin composition of the present invention may have excellent thermal stability and appearance properties. For example, the phenol-based antioxidant may be included in an amount of about 0.1, 0.2, 0.3, 0.4, 0.5, 0.6, 0.7, 0.8, 0.9, 1, 2, 3, 4 or 5 parts by weight.

In one embodiment, the antioxidant and the phosphate-based compound may be included at a weight ratio of about 1:2 to about 1:13. When they are included at this weight ratio, the thermoplastic resin composition of the present invention may have not only excellent flowability, but also excellent chemical resistance, appearance and mechanical properties. For example, the antioxidant and the phosphate-based compound may be included at a weight ratio of about 1:2 to about 1:7.

In one embodiment, the thermoplastic resin composition may have a flow index of about 40 g/10 min or more as measured at 260° C. under a load of 2.16 kg in accordance with ASTM D1238. For example, the flow index may be about 40 g/10 min to about 65 g/10 min. In this flow index range, the thermoplastic resin composition of the present invention may have excellent flowability, moldability, thermal stability and mechanical properties. For example the flow index may be about 40, 41, 42, 43, 44, 45, 46, 47, 48, 49, 50, 51, 52, 53, 54, 55, 56, 57, 58, 59, 60, 61, 62, 63, 64 or 65 g/10 min.

In one embodiment, the thermoplastic resin composition may have a haze of about 2.0% or less as measured for a 3.2 mm thick sample in accordance with ASTM D1003, and a light transmittance of about 88% or more as a 3.2 mm thick sample in accordance with ASTM D1003. For example, the haze may be more than about 0%, but not more than about 1.5%. As another example, it may be more than about 0%, but not more than about 1.0%. The light transmittance may be about 90% to about 100%. As another example, the light transmittance may be about 92% to about 100%.

In one embodiment, the thermoplastic resin composition may have a yellowness index difference ($\Delta YI$) of about 0.3 or less as calculated according to the following equation 1:

$$\Delta YI = YI_1 - YI_0 \qquad \text{Equation 1}$$

wherein $YI_0$ is a yellowness index measured using a spectrophotometer (Minolta, CM-3700D) for a thermoplastic resin composition sample obtained by injection molding at an injection molding temperature (cylinder temperature) of 250° C. with a cycle time of 20 seconds, and $YI_1$ is a yellowness index measured using the spectrophotometer for a thermoplastic resin composition sample obtained by injection molding at an injection molding temperature (cylinder temperature) of 250° C. after the thermoplastic resin composition in a molten state was left in the cylinder for 15 minutes.

When the thermoplastic resin composition has the above-described yellowness index difference, it may have excellent heat retention stability, and thus even when it is exposed to high temperatures, it may have excellent thermal stability so that decreases in the appearance and mechanical properties thereof can be prevented. For example, the yellowness index difference may be more than about 0, but not more than about 0.3. As another example, it may be about 0, but not more than about 0.2. As still another example, it may be about 0, but not more than about 0.1.

Additives

In one embodiment, the thermoplastic resin composition may further include, based on 100 parts by weight of the polycarbonate resin, about 0.1 parts by weight to about 10 parts by weight of additives. The additives may include one or more of light stabilizers, nucleating agents, lubricants, pigments, dyes and carbon black, but are not limited thereto. For example, the additives may be included in an amount of about 0.1, 0.5, 1, 2, 3, 4, 5, 6, 7, 8, 9 or 10 parts by weight.

Molded Article Formed from Thermoplastic Resin Composition

Another aspect of the present invention is directed to a molded article formed from the thermoplastic resin composition. For example, using the thermoplastic resin composition, a molded article may be produced by a molding method such as injection molding, double injection molding, blow molding, extrusion molding, thermal molding or the like. The molded article may be easily formed by a person skilled in the field to which the present invention pertains.

The molded article may be applied to interior and exterior materials that require high transparency, low birefringence, high flowability and environmentally friendly properties. Specifically, the molded article may be widely applied as a molded article for optical applications, a molded article for electrical/electronic applications, a molded article for automotive applications, etc. In particular, the molded article may be used in applications including, but not limited to, optical films, optical sheets, mobile phones, TVs, notebook housing parts, exterior materials for various OA devices, molded articles for automotive interior/exterior parts, and lighting device housings, which require all high transparency, low birefringence and environmentally friendly properties.

For example, the molded article may be used as a display material such as a curved panel.

Hereinafter, preferred examples of the present invention will be described in further detail. It is to be understood, however, that these examples are for illustrative purposes only and are not intended to limit the scope of the present invention in any way.

Examples and Comparative Examples

Specific components used in the following Examples and Comparative Examples are as follows.

(a) Polycarbonate Resin (a1) A polycarbonate resin (viscosity-average molecular weight: 18,300 g/mol), produced by copolymerizing a diol compound, which includes a plant-derived isosorbide represented by the following formula 1a, with a carbonic diester compound, was used which includes 60 mol % of a repeating unit represented by the following formula 1:

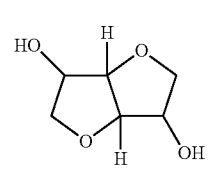

Formula 1a

Formula 1

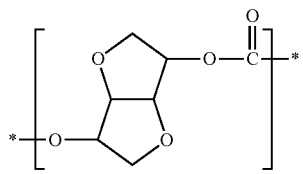

wherein * is a linkage.

(a2) As the diol compound, a polycarbonate resin produced by copolymerizing bisphenol A with a carbonic ester compound was used.

(b) Epoxy Compound

The plant-derived isosorbide of formula 1a was reacted with glycerin to obtain an epichlorohydrin. The epichlorohydrin was subjected to a first reaction in the presence of an aqueous hydroxide solution, thereby producing a first reaction product. Next, the first reaction product was placed under reduced pressure, and then subjected to a second reaction, thereby producing a second reaction product. The upper layer portion of the second reaction product was collected and filtered, thereby producing an epoxy compound (isosorbide diglycidyl ether) having an epoxy equivalent weight of 215 g/eq and a viscosity of 1,275 cps as measured at 25° C. The produced epoxy resin was used.

(c) Phosphate-Based Compound

Resorcinol bis(2,6-dimethylphenyl)phosphate was used.

(d) Antioxidant (d-1) Phosphite-based antioxidant: bis(2,4-dicumylphenyl)pentaerythritol diphosphite represented by the following formula 6a was used.

Formula 6a

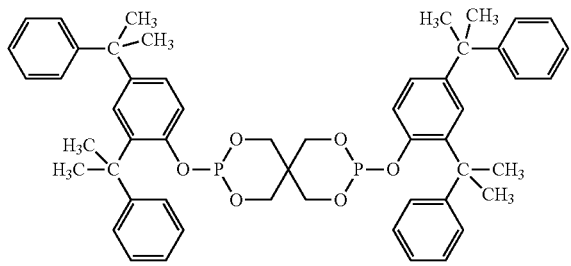

(d-2) Sulfur-based antioxidant: pentaerythritoltetrakis(3-laurylthiopropionate) represented by the following formula 6b was used.

Formula 6b

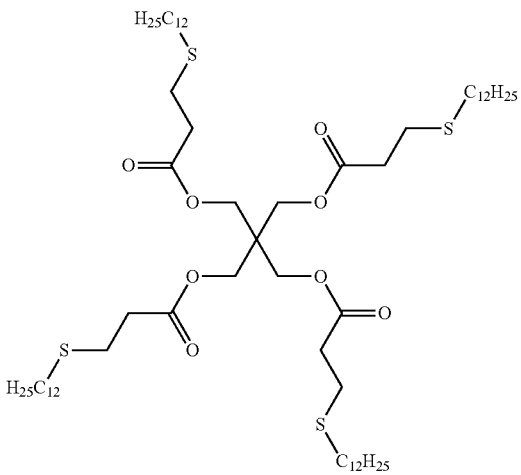

(d-3) Phenol-based antioxidant: octadecyl-3-(3,5-di-tert-butyl-4-hydroxyphenyl)propionate represented by the following formula was used.

Formula 6c

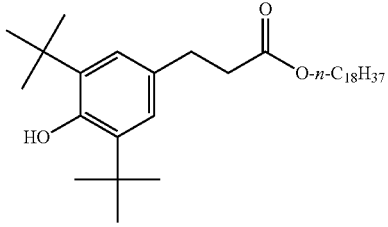

Examples 1 to 9 and Comparative Examples 1 to 7

According to the components with contents shown in Tables 1 and 2 below, the components were mixed in a Henschel mixer, dispersed uniformly, and then extruded through a twin-screw melt extruder (L/D=48, and Φ=25 mm) under the following conditions: a melting temperature of 250° C.; a screw rotating speed of 300 rpm; a first vent pressure of about −600 mmHg; and an auto-feed speed of 30 kg/h. Next, the extruded strands were cooled in water, and then cut with a rotating cutter, thereby preparing pellets. The prepared pellets were dried with hot air at 90 to 100° C. for 4 hours, and then injection-molded at a temperature of 240 to 260° C., thereby preparing samples.

TABLE 1

| Components (unit: parts by weight) | | Examples | | | | | | | | |
|---|---|---|---|---|---|---|---|---|---|---|
| | | 1 | 2 | 3 | 4 | 5 | 6 | 7 | 8 | 9 |
| (a1) | | 100 | 100 | 100 | 100 | 100 | 100 | 100 | 100 | 100 |
| (b) | | 0.21 | 1.05 | 1.05 | 1.05 | 1.05 | 3.14 | 3.14 | 3.14 | 7.81 |
| (c) | | 5.3 | 3.14 | 3.14 | 3.14 | 3.14 | 1.05 | 1.05 | 1.05 | 3.35 |
| (d) | (d-1) | 0.42 | 0.42 | — | — | 0.21 | 0.21 | 0.21 | — | 0.45 |
| | (d-2) | — | — | 0.42 | — | — | 0.21 | — | 0.21 | — |
| | (d-3) | — | — | — | 0.42 | 0.21 | — | 0.21 | 0.21 | — |

TABLE 2

| Components (unit: parts by weight) | | Comparative Examples | | | | | | |
|---|---|---|---|---|---|---|---|---|
| | | 1 | 2 | 3 | 4 | 5 | 6 | 7 |
| (a) | (a1) | 100 | 100 | 100 | 100 | — | 100 | 100 |
| | (a2) | — | — | — | — | 100 | — | — |
| (b) | | — | — | 0.19 | — | 0.21 | 1.04 | 18.4 |
| (c) | | — | 17.8 | 5.57 | 3.09 | 5.3 | — | 3.68 |
| (d) | (d-1) | 0.51 | 0.48 | 5.57 | — | 0.42 | — | 0.49 |
| | (d-2) | — | — | — | — | — | — | — |
| | (d-3) | 0.51 | 0.48 | — | — | — | — | — |

Evaluation of Physical Properties

For the thermoplastic resin composition samples of Examples 1 to 9 and Comparative Examples 1 to 7, the physical properties were evaluated in the following manner, and the results are shown in Tables 8 and 9 below.

(1) Flow index (MI): In accordance with ASTM D1238, the pellet samples of the Examples and the Comparative Examples were dried at 90° C. for 4 hours, and then the amounts that flowed at 260° C. under a load of 2.16 kg for 10 minutes (g/10 min) were measured. The results of the measurement were evaluated according to the criteria shown in Table 3 below.

TABLE 3

| Results of evaluation | MI values measured |
|---|---|
| ⊚ | 60 g/10 min or more |
| ○ | 50 g/10 min to less than 60 g/10 min |
| Δ | 40 g/10 min to less than 50 g/10 min |
| X | Less than 40 g/10 min |

(2) Transmittance test: The transmittances of the 3.2 mm thick samples of the Examples and the Comparative Examples were measured in accordance with ASTM D1003 using Haze-Gard Plus (BYK Gardner), and the results of the measurement were evaluated according to the criteria shown in Table 4 below.

TABLE 4

| Results of evaluation | Transmittance (%) |
|---|---|
| ⊚ | 92 or more |
| ○ | 90 to less than 92 |
| Δ | 88 to less than 90 |
| X | Less than 88 |

(3) Haze test: The hazes of the 3.2 mm thick samples of the Examples and the Comparative Examples were measured in accordance with ASTM D1003 using Haze-Gard Plus (BYK Gardner), and the results of the measurement were evaluated according to the criteria shown in Table 5 below.

TABLE 5

| Results of evaluation | Haze values measured |
|---|---|
| ⊚ | 1.0 or less |
| ○ | More than 1.0 but not more than 1.5 |
| Δ | More than 1.5 but not more than 2.0 |
| X | More than 2.0 |

(4) Heat retention test: In order to perform a heat retention test, the pellets prepared in the Examples and the Comparative Examples were dried in a hot-air dryer at 90° C. for 4 hours. Next, molding of samples having a size of 80 mm×90 mm×3.2 mm was performed for 10 shots or more at a cylinder temperature of 250° C. with a cycle time of 20 seconds to stabilize the conditions, and after 15 minutes, the products were injection-molded.

Specifically, using a spectrophotometer (Minolta, CM-3700D), the yellowness (ΔYI) index difference for each sample was calculated according to the following equation 1, and the results of the calculation were evaluated according to the criteria shown in Table 6 below:

$$\Delta YI = YI_1 - YI_0 \quad \text{Equation 1}$$

wherein $YI_0$ is a yellowness index measured using a spectrophotometer (Minolta, CM-3700D) for a thermoplastic resin composition sample obtained by injection molding at an injection molding temperature (cylinder temperature) of 250° C. with a cycle time of 20 seconds, and $YI_1$ is a yellowness index measured using the spectrophotometer for a thermoplastic resin composition sample obtained by injection molding at an injection molding temperature (cylinder temperature) of 250° C. after the thermoplastic resin composition in a molten state was left in the cylinder for 15 minutes.

In addition, for the samples of the Examples and the Comparative Examples, which were subjected to the heat retention test for 15 minutes, whether an apparent silver streak would occur was examined. The results of the examination were evaluated according to the criteria shown in Table 7 below.

TABLE 6

| Results of evaluation | ΔYI |
|---|---|
| ⊚ | 0.1 or less |
| ○ | More than 0.1 but not more than 0.2 |
| Δ | More than 0.2 but not more than 0.3 |
| X | More than 0.3 |

TABLE 7

| Results of evaluation | Apparent silver streak (after 15 minutes of retention) |
|---|---|
| ○ | No silver streak occurred. |
| Δ | The amount of silver streak that occurred was less than ⅓ of the product surface. |
| X | The amount of silver streak that occurred was ⅓ or more of the product surface. |

(4) Test for environmentally friendly property: Environmentally friendly property was evaluated with BETA LAB TEST by performing the UL ECV project. The amount of environmentally friendly carbon (C14) in the samples of each of the Examples and the Comparative Examples was measured by X-ray diffraction and centrifugation and divided by the amount of general carbon (C12), and the results were expressed as wt %.

the molded articles on one surface of an LCD panel by an optical tape so as to be spaced apart from each other, and an optical display device was manufactured by applying OCR to one surface of an LCD panel and attaching the molded

TABLE 8

| Evaluation items | | Examples | | | | | | | | |
|---|---|---|---|---|---|---|---|---|---|---|
| | | 1 | 2 | 3 | 4 | 5 | 6 | 7 | 8 | 9 |
| MI (melt flow index) | | ⊚ | ○ | ○ | ○ | ○ | ○ | ○ | ○ | ⊚ |
| Transmittance (%) | | ⊚ | ⊚ | ⊚ | ⊚ | ⊚ | ⊚ | ⊚ | ⊚ | ⊚ |
| Haze | | ○ | ○ | ○ | ○ | ○ | ⊚ | ⊚ | ⊚ | ⊚ |
| Heat retention test | Apparent silver streak | ○ | ○ | ○ | ○ | ○ | ○ | ○ | ○ | ○ |
| | ΔYI | ○ | ⊚ | ○ | ⊚ | ⊚ | ⊚ | ⊚ | ○ | ○ |
| Environmentally friendly property (biomass content, wt %) | | 53.0 | 54.1 | 54.1 | 54.1 | 54.1 | 55.2 | 55.2 | 55.2 | 54.1 |

TABLE 9

| Evaluation items | | Comparative Examples | | | | | | |
|---|---|---|---|---|---|---|---|---|
| | | 1 | 2 | 3 | 4 | 5 | 6 | 7 |
| MI (melt flow index) | | X | ⊚ | ⊚ | ○ | ○ | Δ | ⊚ |
| Transmittance | | ○ | ○ | Δ | ⊚ | ⊚ | ⊚ | ⊚ |
| Haze | | ○ | Δ | X | ○ | ○ | ⊚ | ⊚ |
| Heat retention test | Apparent silver streak | ○ | X | ○ | X | Δ | ○ | Δ |
| | ΔYI | ⊚ | X | ○ | X | X | X | Δ |
| Environmentally friendly property (biomass content, wt %) | | 55.4 | 47.2 | 50.4 | 54.3 | 1.1 | 56 | 54.1 |

Referring to the results in Tables 8 and 9 above, it could be seen that the resin compositions according to the Examples of the present invention were measured to have a melt index of 50 g/10 min or more, indicating that these resin compositions have excellent moldability and flowability, excellent appearance properties such as transparency, and excellent thermal stability. In addition, the resin compositions of the Examples had a biomass content of 50 wt % or more, indicating that these compositions are highly environmentally friendly. All the compositions of Examples 1 to 9 showed no silver streak and discoloration in the heat retention test, and showed excellent transparency and haze. However, the resin compositions of Comparative Examples 1 to 7 showed significant decreases in heat retention stability, flowability, transmittance, haze and environmentally friendly properties compared to those of the Examples, suggesting that the various properties of the final products obtained using these compositions are significantly reduced. In addition, it could be seen that the environmentally friendly and mechanical properties of the resin composition of Comparative Example 3, which includes a resin different from the polycarbonate resin of the present invention, were significantly reduced compared to those of Examples 1 to 9.

Evaluation of Optical Performance

Among the samples of the Examples and the Comparative Examples, the sample of Example 1 as a representative was used to evaluate optical performance. Specifically, an optical device was manufactured by preparing molded articles (lenses) using the sample of Example 1, and then disposing the molded articles on one surface of an LCD panel by an optical tape so as to be spaced apart from each other, and an optical display device was manufactured by applying OCR to one surface of an LCD panel and attaching the molded article of Example 1 to the OCR. Next, the white brightness of the optical display devices was measured. The results are shown in FIG. 1.

Referring to FIG. 1, it could be seen that the molded article formed using the sample of Example 1 of the present invention did not deteriorate optical properties.

Reliability Test (1)

Among the samples of the Examples and the Comparative Examples, the sample of Example 9 as a representative was evaluated for reliability by the following items. The results of the evaluation are shown in Table 10 below.

(1) Heat resistance test: The sample was left at a test temperature of 90° C. for 500 hours. Then, using a colorimeter (MINISCAN XE PLUS, HUNTER) and a hazemeter (Haze-Gard Plus, BYK Gardner), the color difference (ΔE) of the sample between before and after the heat resistance test, and the transmittance (%) of the sample after the test, were measured.

(2) Heat cycle resistance test: The sample was heated to a surface temperature of 100° C. and then left alone. This process was repeated for three cycles. Then, the color difference (ΔE) of the sample between before and after the heat cycle resistance test, and the transmittance (%) of the sample after the heat cycle resistance test, were measured.

(3) Cold resistance test: The sample was cooled at −40° C. for 168 hours. Then, the color difference (ΔE) of the sample between before and after the cold resistance test, and the transmittance (%) of the sample after the cold resistance, were measured.

(4) High-temperature/high-humidity resistance test: The sample was left at a test temperature of 85° C. and a relative humidity (RH) of 85% for 500 hours. Then, the color difference (ΔE) of the sample between before and after the high-temperature/high-humidity resistance test, and the transmittance (%) of the sample after the high-temperature/high-humidity resistance test, were measured.

(5) Moisture resistance test: The sample was left at a test temperature of 50° C. and a relative humidity (RH) of 99% for 168 hours. Then, the color difference (ΔE) of the sample between before and after the moisture resistance test, and the transmittance (%) of the sample after the moisture resistance test, were measured.

(6) Heat shock test: The sample was left at 85° C. for 0.5 hours and then left at −40° C. for 0.5 hours. This process was repeated for 500 cycles. Next, the color difference (ΔE) of the sample between before and after the heat shock test, and the transmittance (%) of the sample after the heat shock test, were measured.

TABLE 10

| Example 9 | Before test | Heat resistance | Heat cycle resistance | Cold resistance | High-temperature/high-humidity resistance | Moisture resistance | Heat shock |
|---|---|---|---|---|---|---|---|
| Color difference (ΔE) | — | 1.07 | 0.29 | 0.34 | 1.22 | 0.67 | 0.28 |
| Transmittance (%) | 89.5 | 89.4 | 89.4 | 89.3 | 89.4 | 89.5 | 89.2 |

From the results in Table 10 above, it could be seen that the sample of Example 9 had excellent reliability.

Reliability Test (2)

The samples of Examples 1 to 9 were evaluated for reliability by the following items, and the results of the evaluation are shown in Table 11 below.

(1) Heat resistance test (1): The sample was left at a test temperature of 90° C. for 500 hours, and then observed visually. Whether significant discoloration, fading, swelling or cracking of the sample would occur was evaluated, and the results of the evaluation were judged as follows: ⊚=significant discoloration, fading, swelling or cracking of the sample did not occur; and X=significant discoloration, fading, swelling or cracking of the sample occurred.

(2) Moisture resistance test (1): The sample was left at a test temperature of 50° C. and a relative humidity (RH) of 99% for 168 hours, and then observed visually. Whether significant discoloration, fading, swelling or cracking of the sample would occur was evaluated, and the results of the evaluation were judged as follows: ⊚=significant discoloration, fading, swelling or cracking of the sample did not occur; and X=significant discoloration, fading, swelling or cracking of the sample occurred.

(3) High-temperature/high-humidity resistance test: The sample was left at a test temperature of 85° C. and a relative humidity (RH) of 85% for 500 hours, and then observed visually. Whether significant discoloration, fading, swelling or cracking of the sample would occur was evaluated, and the results of the evaluation were judged as follows: ⊚=significant discoloration, fading, swelling or cracking of the sample did not occur; and X=significant discoloration, fading, swelling or cracking of the sample occurred.

(4) Heat shock test: The sample was left at 85° C. for 0.5 hours and then left at −40° C. for 0.5 hours. This process was repeated for 500 cycles, and then visual observation was performed. Whether significant discoloration, fading, swelling or cracking of the sample would occur was evaluated, and the results of the evaluation were judged as follows: ⊚=significant discoloration, fading, swelling or cracking of the sample did not occur; and X=significant discoloration, fading, swelling or cracking of the sample occurred.

(5) Heat cycle resistance test: The sample was heated to a surface temperature of 100° C. and then left alone. This process was repeated for 3 cycles, and then visual observation was performed. Whether significant discoloration, fading, swelling or cracking of the sample would occur was evaluated, and the results of the evaluation were judged as follows: ⊚=significant discoloration, fading, swelling or cracking of the sample did not occur; and X=significant discoloration, fading, swelling or cracking of the sample occurred.

(6) Low-temperature resistance test: The sample was cooled at −40° C. for 168 hours, and then observed visually. Whether significant discoloration, fading, swelling or cracking of the sample would occur was evaluated, and the results of the evaluation were judged as follows: ⊚=significant discoloration, fading, swelling or cracking of the sample did not occur; and X=significant discoloration, fading, swelling or cracking of the sample occurred.

(7) Heat resistance test (2): The sample was left at 95° C. for 168 hours, and then observed visually. Whether significant discoloration, fading, swelling or cracking of the sample would occur was evaluated, and the results of the evaluation were judged as follows: ⊚=significant discoloration, fading, swelling or cracking of the sample did not occur; and X=significant discoloration, fading, swelling or cracking of the sample occurred.

(8) Moisture resistance test (2): The sample was left at a test temperature of 38° C. and a relative humidity (RH) of 98% for 144 hours, and then observed visually. Whether significant discoloration, fading, swelling or cracking of the sample would occur was evaluated, and the results of the evaluation were judged as follows: ⊚=significant discoloration, fading, swelling or cracking of the sample did not occur; and X=significant discoloration, fading, swelling or cracking of the sample occurred.

(9) Impact resistance test: The sample was left at −30° C. for 4 hours, and then a 510-g weight was dropped onto the sample surface, and judgment was performed as follows: ⊚=the sample was not cracked; and x=the sample was cracked.

TABLE 11

| Evaluation item | Examples | | | | | | | | |
|---|---|---|---|---|---|---|---|---|---|
| | 1 | 2 | 3 | 4 | 5 | 6 | 7 | 8 | 9 |
| Heat resistance (1) | ⊚ | ⊚ | ⊚ | ⊚ | ⊚ | ⊚ | ⊚ | ⊚ | ⊚ |
| Moisture resistance | ⊚ | ⊚ | ⊚ | ⊚ | ⊚ | ⊚ | ⊚ | ⊚ | ⊚ |
| High-temperature/high-humidity resistance | ⊚ | ⊚ | ⊚ | ⊚ | ⊚ | ⊚ | ⊚ | ⊚ | ⊚ |
| Heat shock resistance | ⊚ | ⊚ | ⊚ | ⊚ | ⊚ | ⊚ | ⊚ | ⊚ | ⊚ |
| Heat cycle resistance | ⊚ | ⊚ | ⊚ | ⊚ | ⊚ | ⊚ | ⊚ | ⊚ | ⊚ |
| Low-temperature resistance | ⊚ | ⊚ | ⊚ | ⊚ | ⊚ | ⊚ | ⊚ | ⊚ | ⊚ |
| Heat resistance (2) | ⊚ | ⊚ | ⊚ | ⊚ | ⊚ | ⊚ | ⊚ | ⊚ | ⊚ |
| Moisture resistance (2) | ⊚ | ⊚ | ⊚ | ⊚ | ⊚ | ⊚ | ⊚ | ⊚ | ⊚ |
| Impact resistance | ⊚ | ⊚ | ⊚ | ⊚ | ⊚ | ⊚ | ⊚ | ⊚ | ⊚ |

From the results in Table 11 above, it could be seen that the thermoplastic resin composition of the present invention had excellent reliability properties, including heat resistance, moisture resistance, high-temperature/high-humidity resistance and heat shock resistance.

Thus, it can be seen that when the thermoplastic resin composition of the present invention is used to produce a molded article, it can show excellent properties such as heat retention stability, flowability and the like while it retains excellent environmentally friendly properties and optical properties.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A thermoplastic resin composition comprising:
   100 parts by weight of a polycarbonate resin comprising a repeating unit represented by the following formula 1;
   0.2 parts by weight to 15 parts by weight of an epoxy resin represented by the following formula 2;
   1.05 part by weight to 4 parts by weight of a phosphate-based compound represented by the following formula 5; and
   an antioxidant;
   wherein the antioxidant comprises one or more selected from the group consisting of phosphite-based antioxidants, sulfur-based antioxidants and phenol-based antioxidants,
   wherein the antioxidant and the phosphate-based compound are contained at a weight ratio of 1:2 to 1:13,
   wherein the thermoplastic resin composition has a flow index of 50 g/10 min to 65 g/10 min as measured at 260° C. under a load of 2.16 kg in accordance with ASTM D1238; a haze of more than 0%, but not more than 1.5% or less as measured for a 3.2-mm sample in accordance with ASTM D1003; and a transmittance of 90% or more as measured for a 3.2 mm thick sample in accordance with ASTM D1003:

Formula 1

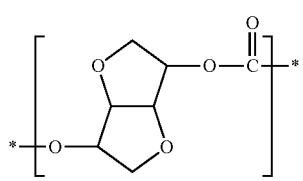

wherein * is a linkage;

Formula 2

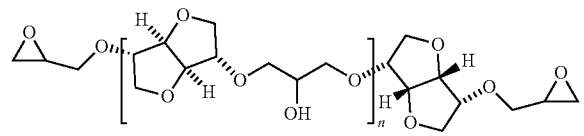

wherein n is an integer ranging from 0 to 300,

Formula 5

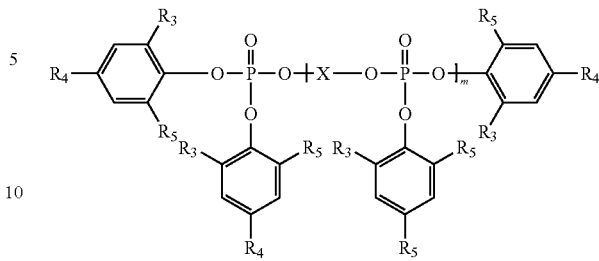

wherein $R_3$, $R_4$ and $R_5$ are each independently hydrogen or a $C_1$-$C_4$ alkyl group; X is a $C_6$-$C_{20}$ aryl group or a $C_6$-$C_{20}$ aryl group substituted with a $C_1$-$C_4$ alkyl group, and m is an integer ranging from 1 to 4.

2. The thermoplastic resin composition of claim 1, wherein the polycarbonate resin is produced by copolymerization of a diol compound, which comprises a plant-derived isosorbide represented by the following formula 1a, with a carbonic diester compound:

Formula 1a

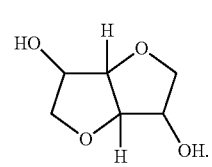

3. The thermoplastic resin composition of claim 1, wherein the polycarbonate resin comprises 30 mol% to 95 mol% of the repeating unit of formula 1.

4. The thermoplastic resin composition of claim 1, wherein the polycarbonate resin has a viscosity-average molecular weight of 15000 g/mol to 25000 g/mol.

5. The thermoplastic resin composition of claim 1, wherein the epoxy resin represented by formula 2 is produced by a process comprising:
   reacting plant-derived isosorbide with glycerin to obtain an epichlorohydrin; and
   allowing the epichlorohydrin to react in the presence of an aqueous hydroxide solution.

6. The thermoplastic resin composition of claim 1, wherein the epoxy resin has an epoxy equivalent weight of 100 g/eq to 300 g/eq and a viscosity of 1,000 cps to 10,000 cps as measured at 25° C.

7. The thermoplastic resin composition of claim 1, wherein the phosphate-based compound comprises one or more of resorcinol bis(diphenyl)phosphate, resorcinol bis(2,6-dimethylphenyl)phosphate, resorcinol bis(2,4-di-tertairy-butylphenyl)phosphate, hydroquinol bis(2,6-dimethylphenyl)phosphate, and hydroquinol bis(2,4-di-tertairy-butylphenyl)phosphate.

8. The thermoplastic resin composition of claim 1, wherein the thermoplastic resin composition has a yellowness index difference ($\Delta YI$) of 0.3 or less as calculated according to the following equation 1:

$$\Delta YI = YI_1 - YI_0 \qquad \text{Equation 1}$$

wherein $YI_0$ is a yellowness index measured using a spectrophotometer for a thermoplastic resin composition sample obtained by injection molding at an injection molding temperature (cylinder temperature) of 250° C. with a cycle time of 20 seconds, and $YI_1$ is a yellowness index measured for a thermoplastic resin composition sample obtained by injection molding at an injection molding temperature (cylinder temperature) of 250° C. after the thermoplastic resin composition in a molten state was left in the cylinder for 15 minutes.

9. A molded article formed from a thermoplastic resin composition according to claim 1.

* * * * *